US010168798B2

(12) United States Patent
Tsang

(10) Patent No.: US 10,168,798 B2
(45) Date of Patent: Jan. 1, 2019

(54) HEAD MOUNTED DISPLAY

(71) Applicant: Tower Spring Global Limited, Road Town, Tortola, BVI (GB)

(72) Inventor: Eric Kwong Hang Tsang, Hong Kong (CN)

(73) Assignee: Tower Spring Global Limited, Tortola (VG)

( * ) Notice: Subject to any disclaimer, the term of this patent is extended or adjusted under 35 U.S.C. 154(b) by 209 days.

(21) Appl. No.: 15/279,432

(22) Filed: Sep. 29, 2016

(65) Prior Publication Data

US 2018/0088682 A1   Mar. 29, 2018

(51) Int. Cl.
| | | |
|---|---|---|
| *G06F 3/02* | (2006.01) | |
| *G06T 19/20* | (2011.01) | |
| *G06T 19/00* | (2011.01) | |
| *G06F 3/00* | (2006.01) | |
| *G06F 3/0489* | (2013.01) | |

(52) U.S. Cl.
CPC ............... *G06F 3/02* (2013.01); *G06F 3/005* (2013.01); *G06F 3/04897* (2013.01); *G06T 19/006* (2013.01); *G06T 19/20* (2013.01); *G06T 2219/028* (2013.01)

(58) Field of Classification Search
CPC ......... G06F 3/005; G06F 3/02; G06T 19/006; G06T 19/20; G06T 2219/028
See application file for complete search history.

(56) References Cited

U.S. PATENT DOCUMENTS

| 8,212,859 B2 | 7/2012 | Tang et al. |
| 9,041,741 B2 | 5/2015 | Mabbutt et al. |
| 9,219,901 B2 | 12/2015 | Mulholland et al. |
| 9,250,444 B2 | 2/2016 | Magyari |
| 9,839,166 B2 * | 12/2017 | Kim .................. H05K 7/20972 |
| 2002/0089546 A1 * | 7/2002 | Kanevsky ............. G06F 3/0481 |
| | | 715/800 |
| 2008/0198920 A1 * | 8/2008 | Yang ................... H04N 19/597 |
| | | 375/240.01 |
| 2011/0148935 A1 * | 6/2011 | Arrasvuori ........... G06F 1/1626 |
| | | 345/676 |
| 2012/0163702 A1 * | 6/2012 | Ikeda ................. H04N 13/0011 |
| | | 382/154 |
| 2013/0179814 A1 * | 7/2013 | Immaneni ............. G06F 3/0489 |
| | | 715/769 |
| 2013/0265300 A1 * | 10/2013 | Vardi ....................... G06F 1/163 |
| | | 345/419 |
| 2015/0074575 A1 * | 3/2015 | Jeon et al. .......... G06F 3/04886 |
| | | 715/768 |
| 2015/0095833 A1 * | 4/2015 | Kim .................... G06F 3/04886 |
| | | 715/773 |

(Continued)

FOREIGN PATENT DOCUMENTS

WO   WO2015126987 A1   8/2015

*Primary Examiner* — Patrick N Edouard
*Assistant Examiner* — Peijie Shen
(74) *Attorney, Agent, or Firm* — Eagle IP Limited; Jacqueline C. Lui

(57) ABSTRACT

Head-mounted display (HMD) provides a virtual reality to a user that controls the HMD with a keyboard. The HMD has a housing with a left lens and a right lens, a smartphone that includes a display, a camera that captures video signals of the keyboard, and a processer. The display simultaneously displays the virtual reality and the keyboard through which instructions are sent from the user to the HMD.

17 Claims, 4 Drawing Sheets

(56) References Cited

U.S. PATENT DOCUMENTS

| | | | |
|---|---|---|---|
| 2015/0205372 A1* | 7/2015 | Kim | G06F 3/0304 345/169 |
| 2016/0062125 A1* | 3/2016 | Baek | G02B 27/0176 361/679.01 |
| 2016/0062454 A1* | 3/2016 | Wang | G09G 5/003 345/633 |
| 2016/0103605 A1* | 4/2016 | Mese | G06F 3/017 345/174 |
| 2016/0232879 A1* | 8/2016 | Han | G06T 3/20 |
| 2016/0255748 A1* | 9/2016 | Kim | H05K 7/20972 361/695 |
| 2016/0337612 A1* | 11/2016 | Im | G06T 19/006 |
| 2017/0076502 A1* | 3/2017 | Chen | G06T 19/006 |
| 2017/0094816 A1* | 3/2017 | Yun | G02B 27/022 |
| 2017/0123492 A1* | 5/2017 | Marggraff | G06F 3/0236 |
| 2017/0153672 A1* | 6/2017 | Shin | G02B 27/0176 |
| 2017/0263056 A1* | 9/2017 | Leppanen | G06F 3/04895 |
| 2017/0287215 A1* | 10/2017 | Lalonde | G06T 19/006 |
| 2017/0336872 A1* | 11/2017 | Osterhout | G02B 27/0172 |
| 2018/0136816 A1* | 5/2018 | Tao | G06F 3/033 |

* cited by examiner

HEAD MOUNTED DISPLAY

FIELD OF THE INVENTION

The present invention relates to a method and device for displaying a semi-immersive virtual reality.

BACKGROUND

A head-mounted display (HMD) is a device that a person wears on the head in order to have video information displayed in front of the eyes. A virtual reality (VR) HMD can provide a user with a complete immersive experience. Due to a closed environment, however, users are not able to view physical objects in their surroundings simultaneously with the VR objects.

New methods and systems that provide improved virtual reality methods and apparatus will assist in advancing technological needs and solving technological problems.

SUMMARY OF THE INVENTION

Figure 1A:
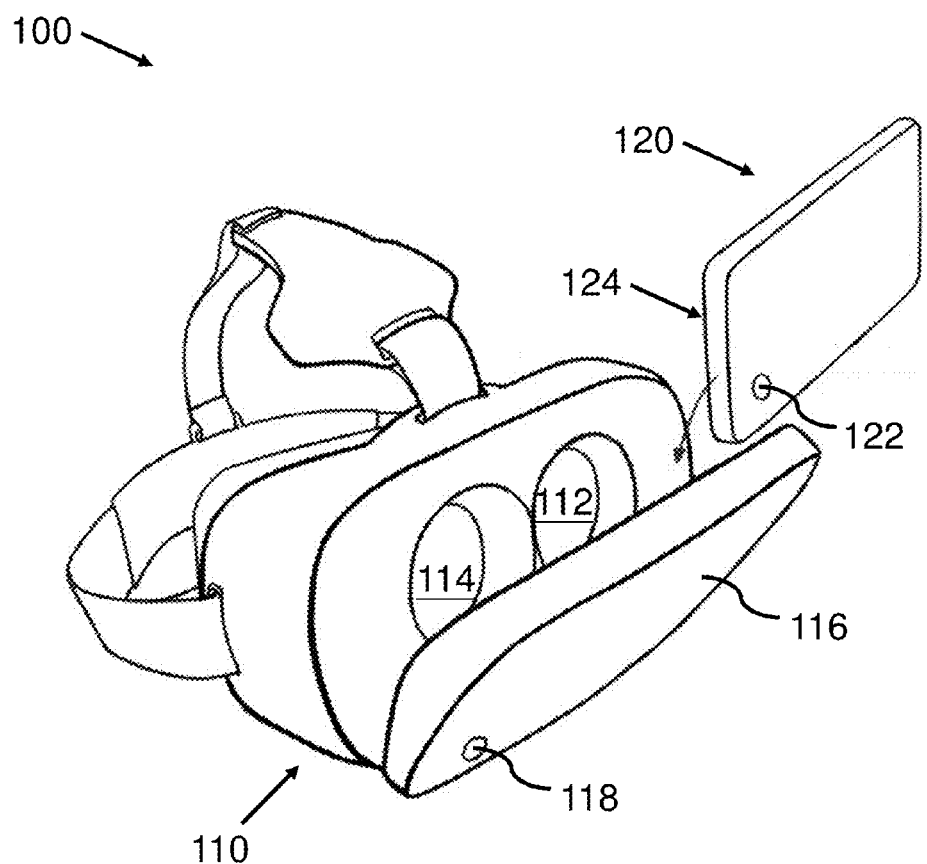
FIG. 1A shows a head mounted display (HMD) with a portable electronic device poised to be received therein in accordance with an example embodiment.

One example embodiment is a head-mounted display (HMD) that provides a virtual reality to a user that controls the HMD with a keyboard. The HMD comprises a housing with a left lens and a right lens, a smartphone that includes a display, and a camera that captures video signals of the keyboard. The display simultaneously displays the virtual reality and the keyboard through which instructions are sent from the user to the HMD.

Other example embodiments are discussed herein.

DETAILED DESCRIPTION

Example embodiments relate to an apparatus and methods that display semi-immersive virtual reality, which includes virtual reality objects and objects in the proximate environment of the user.

HMDs show stereoscopic images and provide virtual reality to users by splitting the source image into two identical images on the left and right side of the display. The lenses of the HMD focus and reshape the left and right images for each eye and create a stereoscopic 3D image by simulating the angular difference between the images viewed by each eye of the user when looking at an object.

In many HMDs, the users see a virtual reality environment that is a fully immersive experience. Users are not able to view physical objects in their surroundings, such as objects (including people) that are near or proximate to the user wearing the HMD. This situation can create problems since the user is visually cutoff from the external surrounding environment.

Example embodiments solve this problem by providing a HMD with a display and a camera that captures video signals of the surrounding objects. The display of the HMD simultaneously displays the virtual reality and the physical objects in the user's environment to the user.

Input devices can interact with VR objects and provide instructions and commands in VR systems. Currently, input devices range from controllers with buttons or sticks to electronic gloves and voice recognition software. These input devices can pose a problem since users can have difficulties in controlling the input since their eyes are covered by the HMD. The body of the HMD in effect blocks of shields the user from seeing the input device.

Example embodiments solve this problem by controlling the HMD with a keyboard or other input device that can be simultaneously viewed by the user on the display of the HMD with the VR objects. The keyboard communicates with the processor of the HMD to convey instructions or commands from the users.

In one example embodiment, a head-mounted display (HMD) includes a housing with left and right lenses and a portable electronic device (such as a smartphone) enclosed inside the housing of the HMD. One or more cameras of the smartphone capture video signals of physical objects in the environment of the user who wears the HMD. The display of the portable electronic device, which is viewed by the user through the lenses of the HMD, simultaneously displays the virtual reality and the surrounding physical objects to provide a semi-immersive experience to the user.

In one example embodiment, the keyboard, as one example physical object in the environment of the user, is captured by the camera and displayed on the display of the smartphone. The keyboard is in communication with the processor of the HMD through wireless data communication, such as Bluetooth, to convey instructions from the user to the processor or other hardware of the HMD.

In one example embodiment, the display of the smartphone simultaneously shows the virtual reality in a first window and the physical objects in the environment of the user in a second window. The first and second windows either occupy different areas of the display or overlap with each other to some extent. In one example, the second window showing the physical objects is superimposed on the virtual reality on the first window. The position, transparency, size, and blending effect of the first and second windows can be manually adjusted by the user through the keyboard or automatically adjusted by the processor such that both two windows are viewable by the user or wearer of the HMD.

In another example embodiment, the physical object in the environment is not displayed in a window, but displayed along with the objects in the virtual reality. The user can discern or distinguish between the VR objects and the physical objects in the surrounding environment. For example, the user can distinguish these two objects based on a location of the physical object on the display (e.g., placing the physical object in an area or location on the display that the user knows is reserved or designated for physical objects). As another example, the user can distinguish these two objects based on a size, shape, or color of the physical object. For instance, the physical object is highlighted with a color to indicate it is not part of the VR scenery. As yet another example, text or other visual indicia is displayed to indicate that the physical object is not part of the VR scenery.

In an example embodiment, hardware (such as the processor) monitors boundaries of the first window and the second window to detect an overlap condition where the second window overlaps the first window such that content in the first window is obscured from a user's view. When an overlap condition is detected, the processor adjusts a position and a size or aspect ratio of the first and second windows to occupy different areas on the display so that both the virtual reality in the first window and the physical objects in the second window are viewable on the display by the user.

The user can manually turn on or turn off the second window to switch between fully immersive and semi-immersive virtual reality.

FIG. 1A shows a head mounted display (HMD) 100 in accordance with an example embodiment with a portable electronic device 120 poised to be received therein. By way of example, the portable electronic device is shown as a smartphone. The HMD 100 includes a housing 110 than includes a left lens 112, a right lens 114, and a cover 116 with a hole 118. The housing 110 fits any mobile computing devices such as, but not limited to, smartphones or other electronic devices with a camera. The smartphone 120 includes a display 124 and a camera 122 disposed on a side opposite to the display.

In one example embodiment, the cover of the housing of the HMD connects to the housing via a hinge and moves between an open position (shown in FIG. 1A) and a closed position. The cover forms a cavity such that the smartphone fits inside the housing. The hole on the cover aligns with the camera of the smartphone when the cover is in a closed position and the smartphone is enclosed in the housing.

Figure 1B:
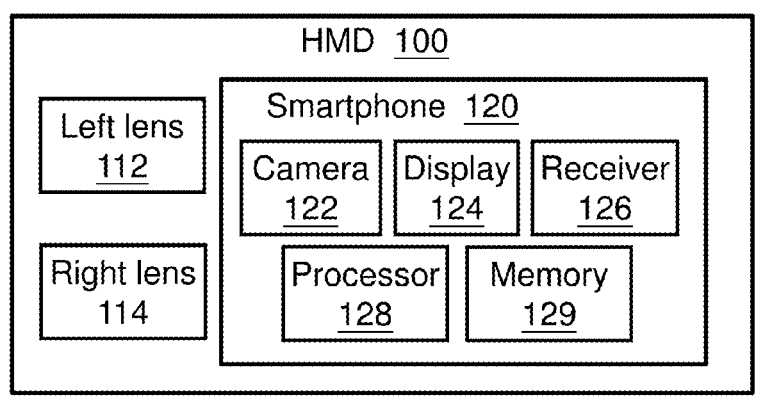
FIG. 1B shows a block diagram of a head mounted display in accordance with an example embodiment.

FIG. 1B shows a block diagram of the head mounted display 100 shown in FIG. 1A. The HMD 100 includes a left lens 112, a right lens 114, and a smartphone 120. The smartphone 120 includes a camera 122, a display 124, a receiver 126, a processor 128 and a memory 129.

By way of example, the receiver receives video signals from a VR source and transmits the signals to the processor of the HMD. The camera captures video signals of physical objects in the user's environment, such as a keyboard, joystick, mouse, or other controller or object. Example embodiments show a keyboard, but one of ordinary skill in the art upon reading this disclosure will understand that other controllers and objects can also be utilized with example embodiments.

The keyboard connects with the processor of the HMD through wireless data communication, such as Bluetooth. The processor, in communication with the camera, the display, the receiver, and the memory, converts the video signals received from the receiver and the camera to a plurality of left images and right images and sends the converted images to the display. The display displays the left images on the left portion of the display that are viewable by a left eye of the user through the left lens. The display also displays the right images on the right portion of the display that are viewable by a right eye of the user through the right lens.

In an example embodiment, the display of the smartphone shows the left and right images of the VR source. The user is able to view the virtual reality on a first window of the display through the left and right lenses. The display shows the left and right images of the keyboard, and the user is able to view the keyboard on a second window of the display or in a second designated area of the display.

In an example embodiment, the first and second windows or areas either occupy different areas of the display or overlap with each other to some extent. As one example, the second window or area showing the keyboard is superimposed on the virtual reality on the first window or area. The position, transparency, size, and blending effect of the first and second windows or areas can be manually adjusted by the user through the keyboard or automatically adjusted by the processor such that both two windows are viewable by the user or wearer of the HMD.

In an example embodiment, the keyboard communicates with the processor or the HMD via Bluetooth or other wireless communication. The user interacts with the HMD via the keyboard. The processor receives input information or commands from the keyboard and sends the input information to the display.

By way of example, the memory of the HMD stores video signals of the VR source and/or images processed and converted by the processor.

Figure 2A:
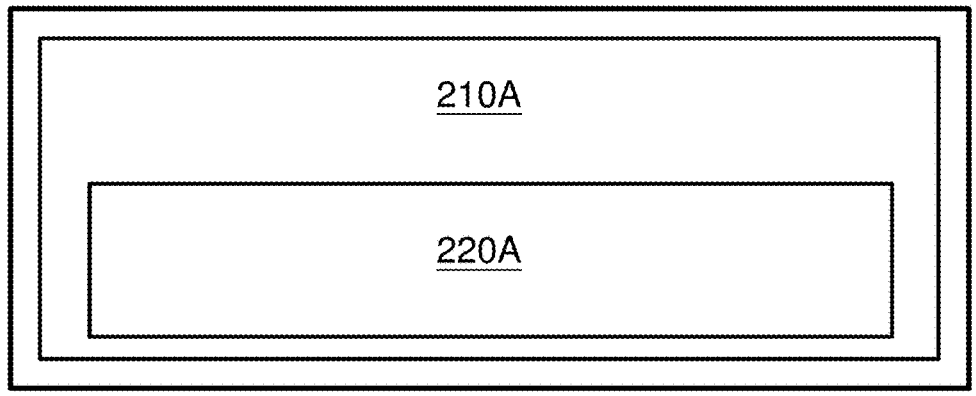
FIG. 2A shows windows displayed on the display of the HMD in accordance with an example embodiment.
Figure 2B:
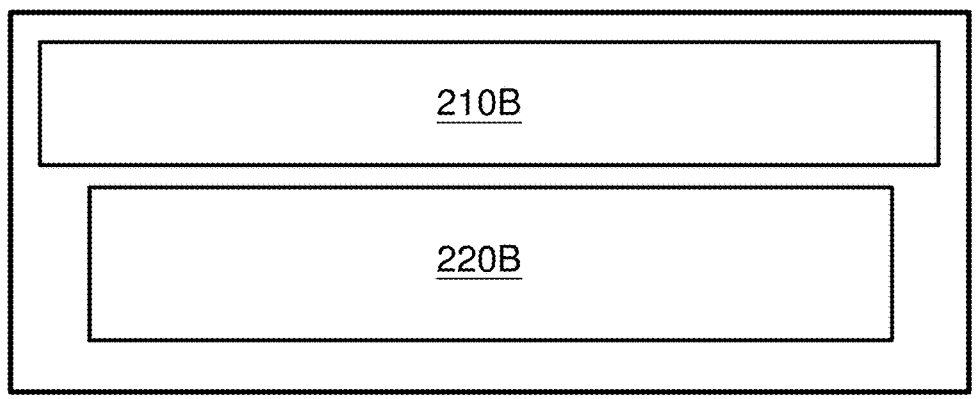
FIG. 2B shows windows displayed on the display of the HMD in accordance with another example embodiment.
Figure 2C:
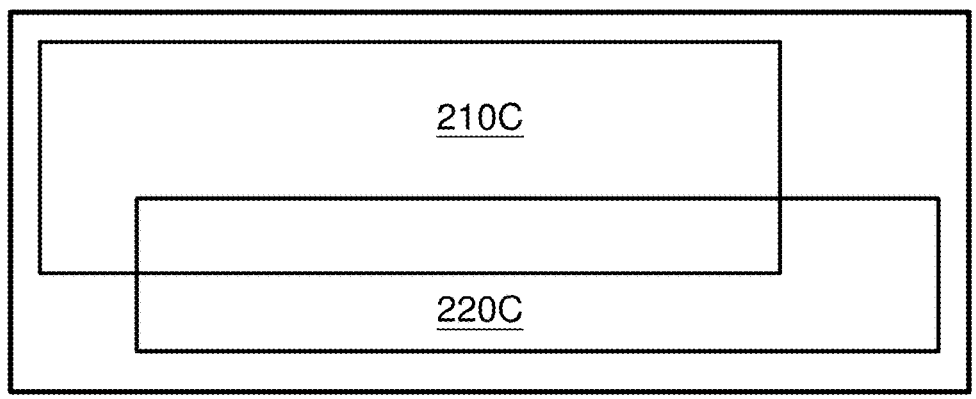
FIG. 2C shows windows displayed on the display of the HMD in accordance with another example embodiment.

FIGS. 2A-2C show examples of the first and second windows displayed on the display of the HMD. The first window shows the VR content and the second window shows the surrounding objects captured by the camera of the portable electronic device, which is shown by way of example as being a smartphone.

In an example embodiment as shown in FIG. 2A, the second window 220A is superimposed on the virtual reality of the first window 210A. The transparency and blending effect of the windows are detected and adjusted by the processor of the HMD such that both windows are viewable by the user of the HMD.

By way of example, the second window displays an image of the keyboard. The keyboard image is adjusted or cropped before blending. For example, only a specific area of the keyboard with functional keys is selected to be displayed.

The following formulas show one example method to obtain a blended image of the keyboard superimposed on the background image in the first window:

$$g = \sum_{i:keyboardimage} Y_{ky}[i] \Big/ \sum_{i:backgroundimage} Y_{bg}[i]$$

$$img_{out} = img_{ky} \times (\alpha/g) + img_{bg} \times (1 - \alpha)$$

where $Y_{ky}$ and $Y_{bg}$ are the luminance signals of the keyboard image and the background image, g is the relative luminance gain of the keyboard image to the background image. The $2^{nd}$ formula, where a is the transparency power of the display region, shows how the luminance gain g calculated by the first formula is applied to the alpha blending process to calculate pixel values in the blended image. The pixel values are in either R/G/B format or Y/U/V format.

Consider an example in which the image is represented by R/G/B format, for a particular pixel in the keyboard image, represented by $img_{ky} = [R_{ky}, G_{ky}, B_{ky}]$, and its corresponding pixel in the background image, represented by $img_{bg} = [R_{bg}, G_{bg}, B_{bg}]$, the output blended pixel, represented by $img_{out} = [R_{out}, G_{out}, B_{out}]$, is calculated by:

$$img_{out} = [R_{out}, G_{out}, B_{out}] =$$
$$img_{ky} \times (\alpha/g) + img_{bg} \times (1 - \alpha) = [R_{ky}(\alpha/g) + R_{bg}(1 - \alpha),$$
$$G_{ky}(\alpha/g) + G_{bg}(1 - \alpha), B_{ky}(\alpha/g) + B_{bg}(1 - \alpha)]$$

where R/G/B components are blended separately.

The above formula is used for calculating the pixel values for each pixel for R/G/B channels, which include an intensity value at 650 nm, an intensity value at 532 nm, and an intensity value at 473 nm.

In another example embodiment as shown in FIG. 2B, the first window 210B and the second window 220B occupy different areas of the display. The position and size of the windows are detected and manually adjusted by the user through the keyboard or automatically adjusted by the processor such that both two windows are viewable by the user or wearer of the HMD. By way of example, the processor of the HMD monitors boundaries of the first window and the second window to detect an overlap condition where the second window overlaps the first window such that a content in the first window is obscured from a view of the user. When an overlap condition is detected, the processor adjusts a position and a size or aspect ratio of the first and second windows to occupy different areas on the display so that both the virtual reality in the first window and the physical objects in the second window are viewable on the display by the user.

In another example embodiment as shown in FIG. 2C, the first window 210C and the second window 220C partially overlap with each other. The position, size, transparency and blending effect of the windows are detected and manually adjusted by the user through the keyboard or automatically adjusted by the processor such that both two windows are viewable by the user of the HMD. By way of example, the processor of the HMD monitors boundaries of the first window and the second window to detect an overlap condition where the second window overlaps the first window such that a content in the first window is obscured from a view of the user. When an overlap condition is detected, the processor adjusts the transparency and blending effect in the overlap area such that both windows, in the overlap area, are viewable by the user of the HMD.

Example embodiments can be utilized where the transparency of the first or second window is not uniform. The transparency in the overlap area may differ from the transparency in other regions of the windows that occupy separate areas.

Figure 3:
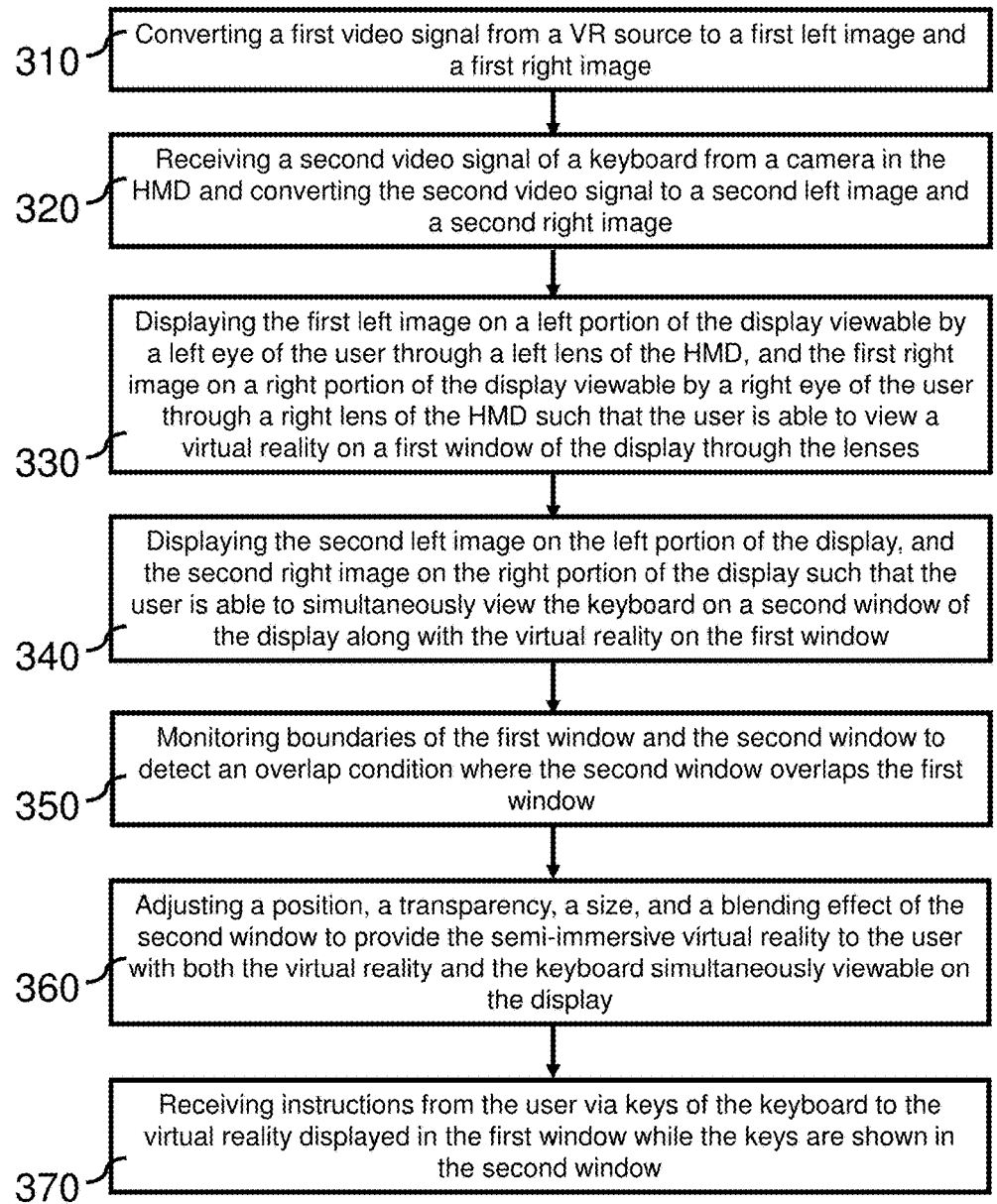
FIG. 3 shows a method that provides a virtual reality (VR) to a user in accordance with an example embodiment.

FIG. 3 shows a method that provides a virtual reality (VR) to a user in accordance with an example embodiment.

Block 310 states converting a first video signal from a VR source to a first left image and a first right image.

Consider an example in which a HMD is equipped with a left lens, a right lens and a smartphone that includes a camera, a display, a receiver, a processor and a memory. The processor receives a first video signal from a VR source via the receiver or the memory of the smartphone. The process extracts frames from the video signals to convert the video signals to a plurality of images. The images are further processed into first left images to be displayed on a left portion of the display and first right images on a right portion of the display.

By way of example, the memory of the HMD stores video signals of the VR source and/or left and right images processed and converted by the processor.

Block 320 states receiving a second video signal of a keyboard from a camera in the HMD and converting the second video signal to a second left image and a second right image.

In an example embodiment, the camera captures video signals of a keyboard in the surroundings of the user. The keyboard is connected with the processor of the HMD through wireless data communication, such as Bluetooth. The processor of the HMD converts the second video signals received from the camera to a plurality of second left images and second right images and send the converted images to the display.

In another example embodiment, two cameras capture video signals of the keyboard for the left eye and the right eye individually. The keyboard is connected with the processor of the HMD through Bluetooth. The processor of the HMD converts the second video signals received from each of the camera to a plurality of second left images and second right images and send the converted images to the display.

Block 330 states displaying the first left image on a left portion of the display viewable by a left eye of the user through a left lens of the HMD, and the first right image on a right portion of the display viewable by a right eye of the user through a right lens of the HMD such that the user is able to view a virtual reality on a first window of the display through the lenses.

By way of example, the display displays the left images on the left portion of the display that is viewable by a left eye of the user through the left lens, and the right images on the right portion of the display that is viewable by a right eye of the user through the right lens. The user views, through the left and right lenses, a virtual reality in a first window of the display. In one example, the view angle and direction depends on the movement of the head of the user and only certain areas of the VR video is displayed according to the movement of the user's head. A gyroscope is built in the smartphone to sense movement of the user and send the sensed data to the processor of the smartphone to calculate view angel and directions in real time. The processor adjusts display content in the first and second windows responsive to the viewing angles of the user.

Block 340 states displaying the second left image on the left portion of the display, and the second right image on the right portion of the display such that the user is able to simultaneously view the keyboard on a second window of the display along with the virtual reality on the first window.

In order to display the VR content in the first window and the keyboard in the second window simultaneously, as an example, the second window is superimposed onto the first window. The transparency and blending effect of the windows are detected and adjusted by the processor of the HMD such that both windows are viewable by the user of the HMD. The second window is automatically opened when a trigger event occurs or is manually opened by the user via the keyboard.

Block 350 states monitoring boundaries of the first window and the second window to detect an overlap condition where the second window overlaps the first window.

Block 360 states adjusting a position, a transparency, a size, and a blending effect of the second window to provide the semi-immersive virtual reality to the user with both the virtual reality and the keyboard simultaneously viewable on the display.

Consider an example embodiment in which the first window and the second window partially overlap with each other. The position, size, transparency and blending effect of the windows are detected and manually adjusted by the user through the keyboard or automatically adjusted by the processor such that both two windows are viewable by the user or wearer of the HMD. By way of example, the processor of the HMD monitors boundaries of the first window and the second window to detect an overlap condition where the second window overlaps the first window such that a content in the first window is obscured from a view of the user. When an overlap condition is detected, the processor adjusts the transparency and blending effect in the overlap area such that both windows, in the overlap area, are viewable by the user of the HMD.

Block 380 states receiving instructions from the user via keys of the keyboard to the virtual reality displayed in the first window while the keys are shown in the second window.

By way of example, users can set up or adjust parameters of the windows, such as the position, size, transparency and blending effect, through the setting interface via keys of the keyboard. There are pre-defined keys for each parameter. The users are able to view the effect of the adjustment immediately on the display.

In addition to setting up the window parameters, the keyboard also communicates with the processor of the HMD to convey instructions from the users such that the users are able to interact with the VR objects or provide commands.

Figure 4:
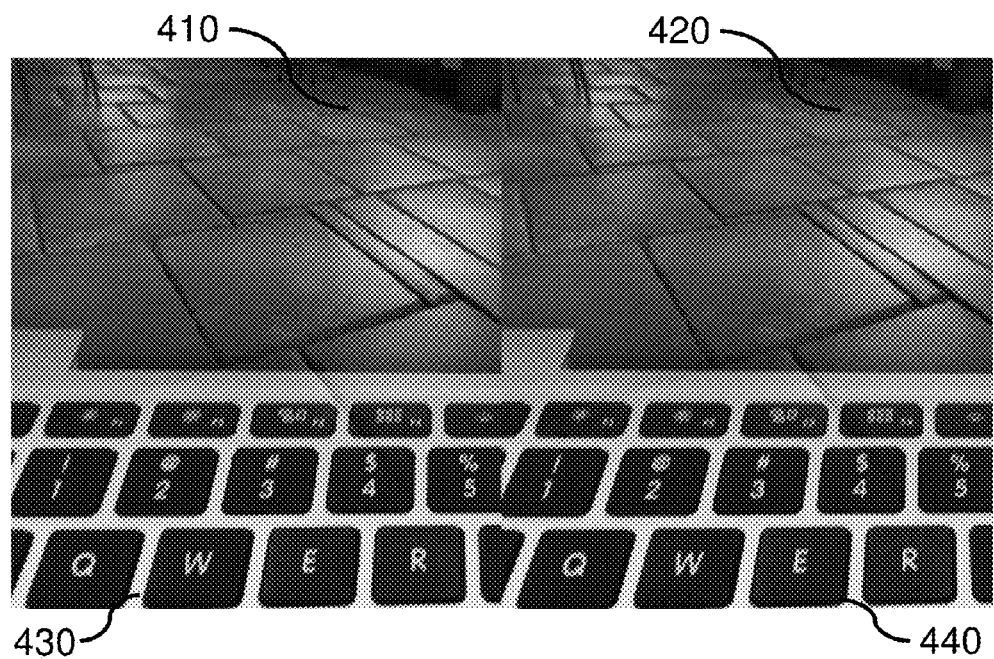
FIG. 4 shows left and right images displayed on the display of the HMD in accordance with an example embodiment.

In an example embodiment, other physical objects in the environment of the user are displayed simultaneously with the virtual reality. The keyboard, as one of the physical objects in the environment of the user, sends commands to the processor of the HMD to control the virtual reality, FIG. 4 shows left and right images displayed on the display of the HMD in accordance with an example embodiment. The first left image 410 and the first right image 420 display virtual reality content obtained from a VR source and processed by the processor. The second left image 430 and the second right image 440 display keyboard images obtained from the camera of the HMD and processed by the processor.

By way of example, the VR content and the keyboard are displayed on different areas of the display. The position and size of the windows are preset by the user through the setting interface so that both the virtual reality and the keyboard are viewable on the display.

The left and right images of the keyboard 430 and 440 are either taken by separate cameras or by one camera. The processor of the HMD converts the images received from one or more cameras to a plurality of left images and right images and send the converted images to the display on which the left images are displayed on the left portion of the display for the left eye of the user and the right images are displayed on the right portion of the display for the right eye of the user.

Figure 5:
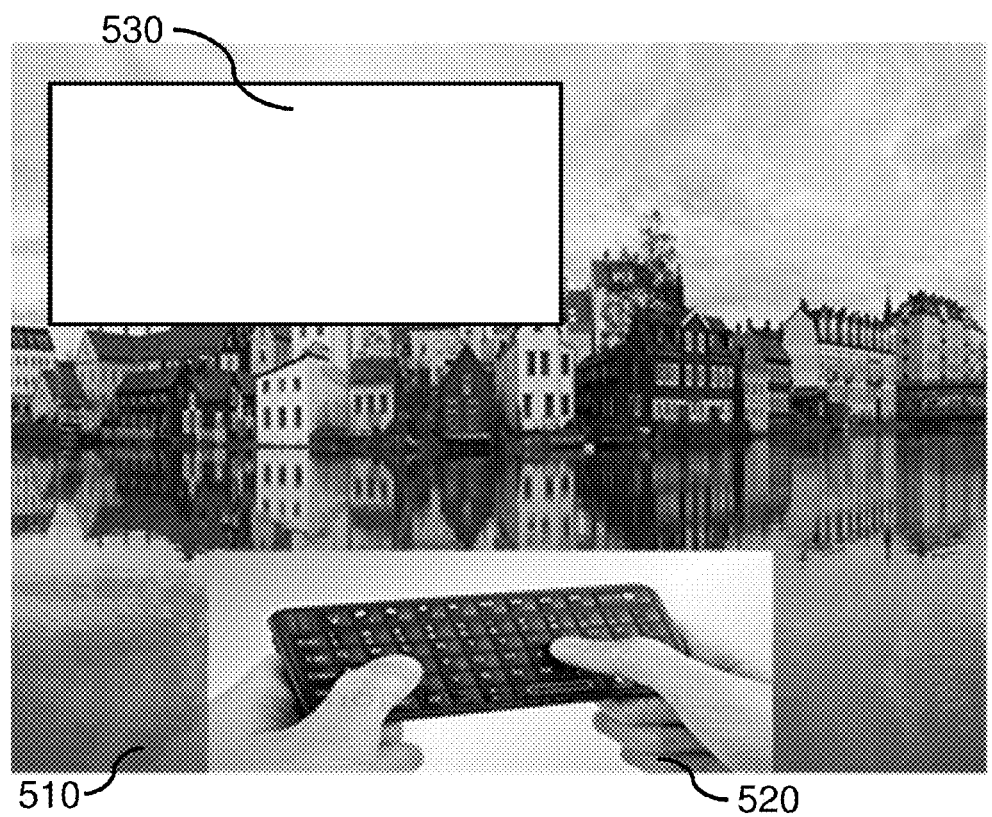
FIG. 5 shows a user's view of the display though the lenses of the HMD in accordance with an example embodiment.

FIG. 5 shows a user's view of the display though the lenses of the HMD in accordance with another example embodiment. The lenses of the HMD focus and reshape the left and right images for each eye and create a stereoscopic image by angling the left and right images to mimic how eyes view the world differently. The virtual reality is displayed in a first window of the display 510 and the keyboard is displayed in a second window 520 superimposed on the first window. A pop-up window 530 is superimposed on the first window to show set-up options or words typed by the user via the keyboard.

By way of example, users can set up the position, transparency, size of the second window superimposed on the first window through setting options of the application software. The blending effect between the first and second windows can also be adjusted through the setting options. In one example, there are hot keys on the keyboard to turn the second window on and off. Keys on the keyboard can be predefined to adjust the position, transparency, and size of the windows. The effect of the adjustment is immediately shown on the screen or display of the HMD.

In an example embodiment, when the keyboard is in use, the pop-up window 530 is popped out to show a user interface menu and setting options. In another example embodiment, the pop-up window is a chat box showing the words typed by the user via the keyboard.

In an example embodiment, the application software turns on the second window automatically to show the keyboard when a triggering event occurs. For example, when an input or instruction from the user is needed. As one example, only a specific area of the keyboard with functional keys to convey commands from the user is selected to be displayed. The transparency and blending effect of the windows are detected and adjusted automatically by the processor of the HMD such that content in the windows are viewable by the user. For example, API (Application Programming Interface) software allows application to control and adjust the windows.

In another example embodiment, the second window shows the surround objects around the user that are captured by the camera of the HMD. With two windows superimposed to each other or located at different areas, the display of the HMD simultaneously displays the virtual reality and the physical objects in the user's environment. The user can manually turn on or off the second window to switch between fully immersive and semi-immersive virtual reality.

As used herein, a "head mounted display" or "HMD" is an apparatus that can be mounted on the head to provide the wearer a personal viewing experience. Example embodiments include, but not limited to, goggles that are strapped around the back of the head and have a main body or a housing that receives a mobile computing device therein.

As used herein, a "semi-immersive virtual reality" is a virtual reality experience in which the users are able to view the real word simultaneously with the immersive virtual reality.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Blocks and/or methods discussed herein can be executed by a software application, an electronic device, a program, a computer, firmware, hardware, a process, and/or a computer system. Furthermore, blocks and/or methods discussed herein can be executed automatically with or without instruction from a user.

The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other

What is claimed is:

1. A head-mounted display (HMD) that provides a virtual reality to a user that controls the HMD with a keyboard, comprising:
a housing having a left lens and a right lens;
a smartphone inserted in the housing and including:
a display having a left portion and a right portion, the left portion viewable by a left eye of the user through the left lens, the right portion viewable by a right eye of the user through the right lens;
a receiver that receives a first video signal from a VR source;
a camera that captures a second video signal of the keyboard; and
a processor, in communication with the display, the receiver, the camera, and the keyboard, that converts the first video signal from the receiver to a first left image and a first right image, converts the second video signal from the camera to a second left image of the keyboard and a second right image of the keyboard, receives input information from the keyboard, and sends the converted images and the input information to the display,
wherein the display of the smartphone shows the first left image on the left portion and the first right image on the right portion such that the user is able to view the virtual reality on a first window of the display through the left and right lenses,
wherein the display of the smartphone shows the second left image of the keyboard on the left portion and the second right image of the keyboard on the right portion such that the user is able to view the keyboard on a second window of the display simultaneously with the first window,
wherein the processor monitors boundaries of the first window and the second window to detect an overlap condition; where the second window overlaps the first window such that content in the first window is obscured from the user's view; and
further wherein, when the processor detects the overlap condition, the processor automatically adjusts a transparency and blending effect of an overlap area between the first window and the second window such that the transparency in the overlap area differs from the transparency in other regions of the first and second windows that occupy separate areas; and such that the virtual reality of the first window and the keyboard of the second window are both viewable to the user;
wherein the keyboard of the second window is superimposed on the virtual reality of the first window; and wherein the following formulas are used to obtain a blended image of the keyboard superimposed on the virtual reality image in the first window;

$$g = \frac{\sum_{i: keyboardimage} Y_{ky}[i]}{\sum_{i: backgroundimage} Y_{bg}[i]} \quad \text{formula I}$$

$$img_{out} = img_{ky} \times \left(\frac{a}{g}\right) + img_{bg} \times (1 - a) \quad \text{formula II}$$

where in formula I, $Y_{ky}$ and $Y_{bg}$, are luminance signals of keyboard image and background image that is virtual reality image, g is a relative luminance gain of the keyboard image to the background image; and in formula II, where alpha (a) is a transparency power of display region, showing how the luminance gain g calculated by the formula I is applied to alpha blending process to calculate pixel values in the blended image.

2. The HMD of claim 1 further comprising:
a cover that connects to the housing via a hinge and includes hole, wherein the hole of the cover aligns with the camera of the smartphone when the cover is in a closed position such that the cover covers the smartphone.

3. The HMD of claim 1, further comprising:
a cover that moves between an open position and a closed position, forms a cavity into which the smartphone fits, and includes a hole that aligns with a lens of the camera of the smartphone.

4. The HMD of claim 1, wherein the smartphone includes another camera in addition to the camera that captures the second video signal of the keyboard, and further wherein the camera and the another camera capture the second video signal of the keyboard for the left eye and the right eye individually; and the processor converts the second video signal from each of the camera and the another camera to a plurality of second left images and second right images, and send the converted images to the display.

5. The HMD of claim 1, wherein the processor automatically adjusts a position, a transparency, a size, and a blending effect of the first and second windows so that both the virtual reality and the keyboard are viewable on the display.

6. The HMD of claim 1, wherein visual indicia is displayed on the second window to indicate that the keyboard is not part of the virtual reality; wherein the visual indicia is text displayed on the second window.

7. A method executed by a head-mounted display (HMD) that provides a virtual reality (VR) to a user and allows the user to view physical objects in an environment of the user simultaneously with VR objects, the method comprising:
converting, by a processor of the HMD, a first video signal to a first left image and a first right image;
receiving, by the processor of the HMD, a second video signal of the physical objects in the environment of the user from a camera of the HMD and converting the second video signal to a second left image and a second right image;
displaying, on a display of the HMD, the first left image on a left portion of the display viewable by a left eye of the user through a left lens of the HMD, and the first right image on a right portion of the display viewable by a right eye of the user through a right lens of the HMD such that the user is able to view the virtual reality on a first window of the display through the left and right lenses;
displaying, on the display of the HMD, the second left image on the left portion of the display and the second right image on the right portion of the display such that the user is able to view the physical objects in the environment of the user on a second window of the display;
monitoring, by the processor of the HMD, boundaries of the first window and the second window to detect an overlap condition where the second window overlaps the first window such that a content in the first window is obscured from a view of the user; and adjusting automatically, by the processor of the HMD, a transparency and blending effect of an overlap area between the first window and the second window when an overlap condition is detected by the processor, such that the transparency in the overlap area differs from the transparency in other regions of the first and second windows that occupy separate areas and thereby the virtual reality of the first window and the physical objects of the second window are both viewable to the user;

displaying a keyboard simultaneously with the virtual reality, wherein the keyboard is one of the physical objects in the environment of the user, wherein the keyboard of the second window is superimposed on the virtual reality of the first window, and the following formulas are used to obtain a blended image of the keyboard superimposed on the virtual reality image in the first window:

$$g = \frac{\sum_{i:keyboardimage} Y_{ky}[i]}{\sum_{i:backgroundimage} Y_{bg}[i]} \qquad \text{formula I}$$

$$img_{out} = img_{ky} \times \left(\frac{a}{g}\right) + img_{bg} \times (1-a) \qquad \text{formula II}$$

where in formula I, $Y_{ky}$ and $Y_{bg}$, are luminance signals of keyboard image and background image that is virtual reality image, g is a relative luminance gain of the keyboard image to the background image; and in formula II, where alpha (a) is a transparency power of display region, showing how the luminance gain g calculated by the formula I is applied to alpha blending process to calculate pixel values in the blended image.

8. The method of claim 7 further comprising:
adding visual indicia to the second window so as to indicate that the physical objects are not part of the virtual reality,
wherein the visual indicia is text displayed on the second window.

9. The method of claim 7 further comprising:
displaying, on the display of the HMD, a keyboard simultaneously with the virtual reality;
providing input information from the user to the processor of the HMD via the keyboard, the input information including instructions on:
adjusting the position, transparency, size, and blending effect of the first and second windows; and
interacting with the virtual reality displayed in the first window.

10. The method of claim 7 further comprising:
automatically opening, by the processor of the HMD, the second window on the display when a trigger event occurs, wherein the second window includes an image of keyboard that is one of the physical objects in the environment of the user.

11. The method of claim 7 further comprising:
manually opening, by a keyboard in communication with the processor, the second window on the display; and
manually closing, by a keyboard in communication with the processor, the second window on the display.

12. The method of claim 7 further comprising:
relocating, by the processor, the second window to an unobscured portion of the display during an overlap condition so that the second window is viewable on the display by the user.

13. A method executed by a head-mounted display (HMD) that provides a semi-immersive virtual reality to a user, the method comprising:
converting, by a processor of the HMD, a first video signal from a VR source to a first left image and a first right image;
receiving, by the processor of the HMD, a second video signal of a keyboard from a camera in the HMD and converting the second video signal to a second left image and a second right image;
displaying, on a display of the HMD, the first left image on a left portion of the display viewable by a left eye of the user through a left lens of the HMD, and the first right image on a right portion of the display viewable by a right eye of the user through a right lens of the HMD such that the user is able to view a virtual reality on a first window of the display through the left and right lenses;
displaying, on the display of the HMD, the second left image on the left portion of the display, and the second right image on the right portion of the display such that the user is able to simultaneously view the keyboard on a second window of the display along with the virtual reality on the first window;
monitoring, by the processor of the HMD, boundaries of the first window and the second window to detect an overlap condition where the second window overlaps the first window;
adjusting automatically, by the processor of the HMD, a transparency and blending effect of an overlap area between the first window and the second window when an overlap condition is detected by the processor, such that the transparency in the overlap area differs from the transparency in other regions of the first and second windows that occupy separate areas and thereby the virtual reality of the first window and the physical objects of the second window are both viewable to the user; and
receiving instructions from the user via keys of the keyboard to the virtual reality displayed in the first window while the keys are shown in the second window,
wherein the keyboard of the second window is superimposed on the virtual reality of the first window, and the transparency and blending effect of the both windows are detected and adjusted by the processor, and the following formulas are used to obtain a blending image of the keyboard superimposed on the virtual reality image in the first window:

$$g = \frac{\sum_{i:keyboardimage} Y_{ky}[i]}{\sum_{i:backgroundimage} Y_{bg}[i]} \qquad \text{formula I}$$

$$img_{out} = img_{ky} \times \left(\frac{a}{g}\right) + img_{bg} \times (1-a) \qquad \text{formula II}$$

where in formula I, $Y_{ky}$ and $Y_{bg}$, are luminance signals of keyboard image and background image that is virtual reality image, g is a relative luminance gain of the keyboard image to the background image; and in formula II, where alpha (a) is a transparency power of display region, showing how the luminance gain g calculated by the formula I is applied to alpha blending process to calculate pixel values in the blended image.

14. The method of claim 13 further comprising:
receiving, by the processor of the HMD, input information from the keyboard that provides instructions from the user to the processor, the instructions including how to adjust a position, the transparency, a size, and the blending effect of the first and second windows.

15. The method of claim 13 further comprising:
detecting, by one or more motion sensors of the HMD, a viewing angle of the user and sending sensor data to the processor; and
adjusting, by the processor of the HMD, display content in the first and second windows responsive to the viewing angle of the user.

16. The method of claim 13 further comprising:
monitoring, by the processor of the HMD, display content in the first window and popping the second window on the display when a predetermined trigger content occurs.

17. The method of claim 13 further comprising:
manually opening, by a first predetermined key of the keyboard in communication with the processor, the second window on the display; and
manually closing, by a second predetermined key of the keyboard in communication with the processor, the second window on the display.

* * * * *